United States Patent [19]
Lin

[11] Patent Number: 5,328,605
[45] Date of Patent: Jul. 12, 1994

[54] FILTER MODULE

[76] Inventor: John H. J. Lin, No. 7, Ching Cheng 7th St., Taichung, Taiwan

[21] Appl. No.: 88,913

[22] Filed: Jul. 7, 1993

[51] Int. Cl.⁵ ............... B01D 24/06; B01D 27/14; B01D 35/30
[52] U.S. Cl. .................... 210/232; 210/238; 210/266; 210/282; 210/283; 210/284; 210/295; 210/314; 210/446; 210/DIG. 17; 55/518
[58] Field of Search ........... 210/232, 238, 282, 283, 210/266, 445, 446, DIG. 17, 455, 335, 284, 295, 314; 55/518

[56] References Cited

U.S. PATENT DOCUMENTS

| | | |
|---|---|---|
| 190,569 | 5/1877 | Fleming . |
| 661,339 | 11/1900 | Grever . |
| 712,868 | 11/1902 | Traxton . |
| 3,085,689 | 4/1963 | Hering . |
| 3,169,112 | 2/1965 | Nelson . |
| 3,361,261 | 1/1968 | Fairey . |
| 4,025,426 | 5/1977 | Anderson . |
| 4,196,081 | 4/1980 | Pavia . |
| 4,477,347 | 10/1984 | Sylva .................. 210/232 |
| 4,855,046 | 8/1989 | Meehan . |
| 5,141,637 | 8/1992 | Reed . |
| 5,211,851 | 5/1993 | Meurer . |
| 5,215,657 | 6/1993 | Goldfeld .................. 210/283 |
| 5,242,589 | 9/1993 | Kuo . |
| 5,271,837 | 12/1993 | Discepolo . |

*Primary Examiner*—Thomas M. Lithgow
*Attorney, Agent, or Firm*—Flehr, Hohbach, Test, Albritton & Herbert

[57] ABSTRACT

A filtering module includes a housing consisting of an upper housing section and a lower housing section and a connecting member for connecting the upper and lower housing sections. The upper housing section has a first water port in a first end thereof and a pair of substantially L-shaped recesses in a second end thereof. The lower housing section has a second water port in a first end thereof and a second pair of substantially L-shaped recesses in a second end thereof. The connecting member includes a filtering mesh and two pairs of L-shaped protrusions formed on an outer periphery thereof to be fittingly received in associated L-shaped recesses.

2 Claims, 2 Drawing Sheets

FILTER MODULE

BACKGROUND OF THE INVENTION

1. Field of the Invention

The present invention relates to a filter module and, more particularly, to a filter module consisting of more than one section containing different filtering media for effectively filtering water.

2. Description of related art

A typical filter module is generally a housing containing a specific filter medium therein to remove a certain kind of chemical material, such as resin for softening water, active carbon for decomposing toxic chemicals, etc. For achieving multipurpose filtering effect, more than one filter module has to be connected in series such that water may flow through the filter modules one by one to proceed with desired filtering. Such an arrangement is found to have the following disadvantages: (1) the cost is increased; (2) it occupies a considerable space; (3) it is inconvenient for transportation; (4) the filter medium is securely mounted in the filter housing and the whole filter module has to be disposed of when the filter medium is no longer usable, causing a waste in material and also causing environmental problems, especially in the case where the filter module is made of plastic material; and (5) the filter medium is not changeable and thus cannot be applied to different water qualities of different areas.

Therefore, there has been a long and unfulfilled need for an improved filter module to mitigate and/or obviate the above-mentioned problems.

SUMMARY OF THE INVENTION

A filter module provided by the present invention generally includes a housing consisting of an upper housing section each and a lower housing section containing filter media therein, which are different from each other, and a connecting member for connecting the upper and lower housing sections. The upper housing section has a first water port in a first end thereof and a pair of substantially L-shaped recesses in a second end thereof. The lower housing section has a second water port means in a first end thereof and a second pair of substantially L-shaped recesses in a second end thereof. The connecting member includes a filtering mesh and two pairs of L-shaped protrusions formed on an outer periphery thereof to be fittingly received in associated L-shaped recesses.

In another embodiment of the present invention, the housing consists of three housing sections containing three different filter media to proceed with different filtering purposes.

Other objects, advantages, and novel features of the invention will become more apparent from the following detailed description when taken in conjunction with the accompanying drawings.

DESCRIPTION OF THE PREFERRED EMBODIMENTS

Figure 1:
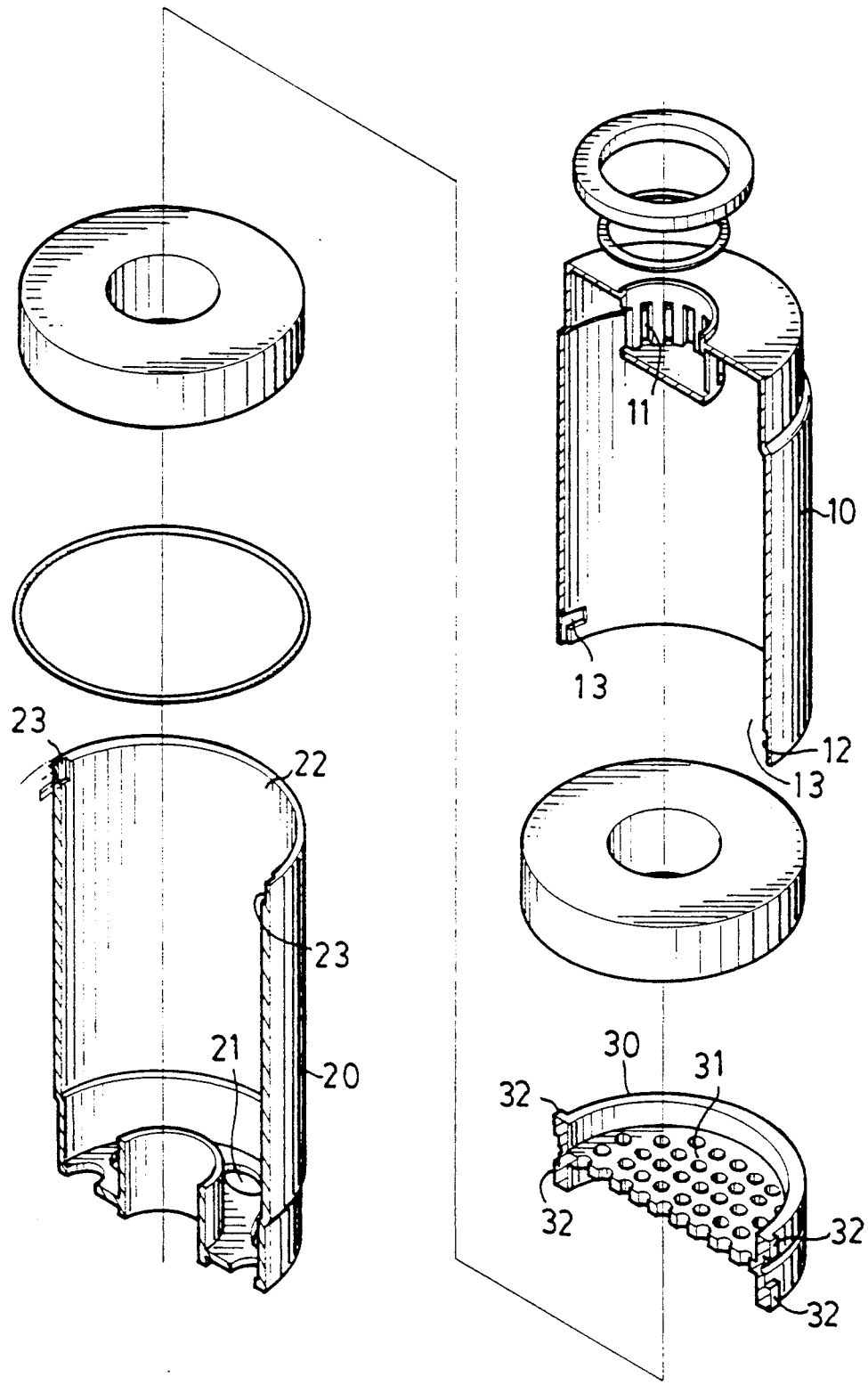
FIG. 1 is an exploded view of a filter module in accordance with the present invention.
Figure 2:
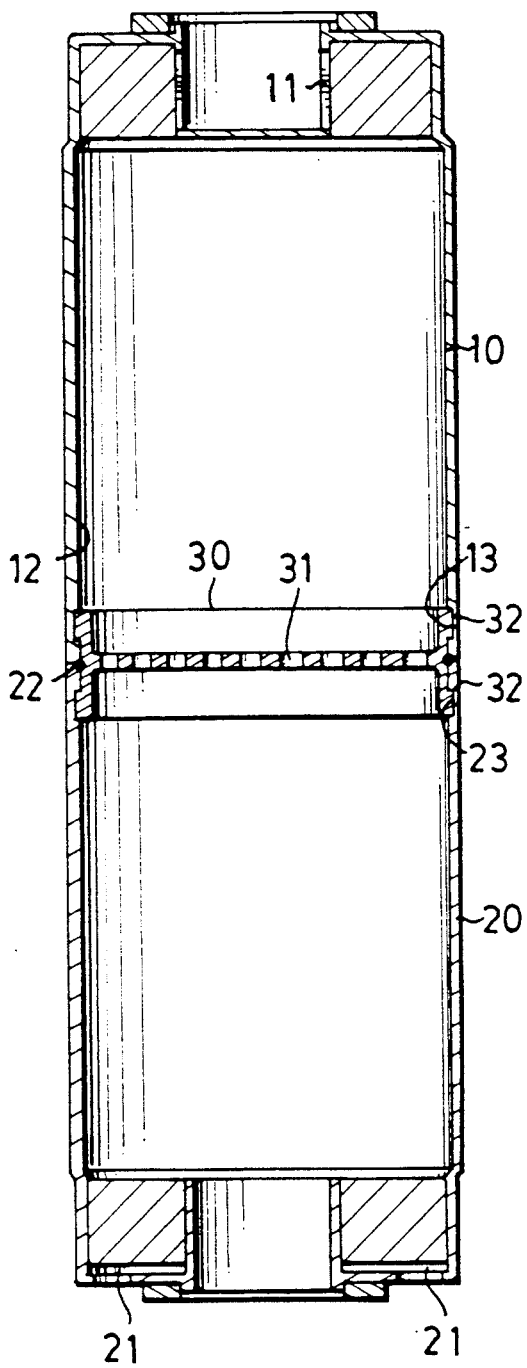
FIG. 2 is a cross-sectional view of the filter module.

Referring to the drawings and initially to FIGS. 1 and 2, a filtering module in accordance with the present invention generally includes a housing consisting of an upper housing section 10 and a lower housing section 20 and a connecting member 30 for connecting the upper and lower housing sections 10 and 20. The upper housing section 10 has a first water port means 11 in a first end thereof and a pair of substantially L-shaped recesses 13 in-a second end 12 thereof. The lower housing section 20 has a second water port means 21 in a first end thereof and a second pair of substantially L-shaped recesses 23 in a second end thereof. The connecting member 30 includes a filtering mesh 31 and two pairs of L-shaped protrusions 32 formed on an outer periphery thereof to be fittingly received in associated L-shaped recesses 13 and 23.

In use, the upper and lower housing sections 10 and 20 may contain filter media therein, which are different from each other, for filtering different undesired chemicals, e.g., the upper housing section 10 may contain resin while the lower housing section 20 may contain active carbon. Water enters into the lower housing section 20 via the second water port means 21, passing through the mesh 31 and the upper housing section 10 and then exits the filter module via the first water port means 11, in which toxic chemicals in water are filtered by active carbon in the lower housing section 20 and the water is then softened by the resin in the upper housing section 10.

Figure 3:
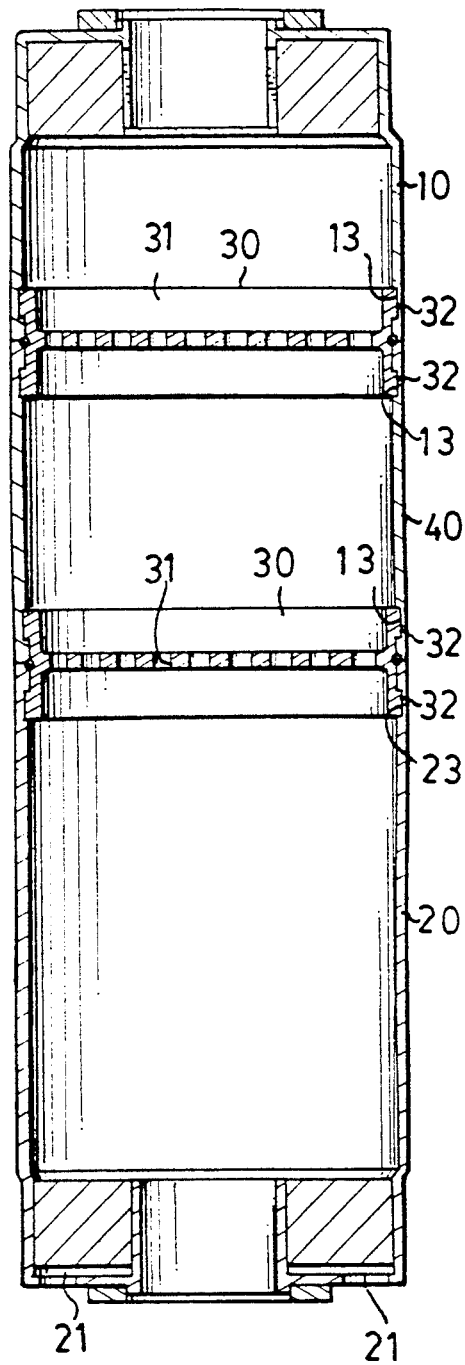
FIG. 3 is a cross-sectional view illustrating another embodiment of the filter module in accordance with the present invention.

FIG. 3 shows another embodiment of the filter module in which the filter housing is consisted of three housing sections 10, 40, and 20 containing three different filter media for effecting three different filtering purposes and two connecting members 30 are provided to connect the housing sections.

The above arrangement has the following advantages: (1) a filter module may proceed with multi-filtering functions, thereby greatly reducing the cost, occupying less space, and being convenient for transportation; and (2) the filter medium may be changed without disposing of the housing, thereby greatly reducing the environmental problems.

Although the invention has been explained in relation to its preferred embodiment, it is to be understood that many other possible modifications and variations can be made without departing from the spirit and scope of the invention as hereinafter claimed.

I claim:

1. A filtering module comprising:
    a housing having a first housing section containing a first fluid inlet, a first fluid outlet, and a first filter medium contained therebetween;
    a second housing section containing a second fluid inlet, a second fluid outlet, and a second filter medium contained therebetween;
    each said filter medium being different from each other; and
    connecting member means for serially and for releasably connecting said first and second housing sections at said first fluid outlet and said second fluid inlet and for causing fluid flow through said first fluid outlet to flow into said second fluid inlet; wherein a fluid flow path is defined from said first fluid inlet to said second fluid outlet;

said connecting member means having a filtering mesh that extends across said fluid flow path between said first and second housing sections;

said first and second housing sections having a plurality of L-shaped recesses and said connecting member means including correspondingly formed L-shaped protrusions on an outer periphery thereof to be fittingly received in associated said L-shaped recesses.

2. A filtering module according to claim 1, further including a third housing section containing therein a third filter medium and a second connecting member means for serially and releasably connecting said second housing section to said third housing section.

* * * * *